Nov. 17, 1970  R. R. GIDNER ET AL  3,540,065

ADJUSTABLE COUPLING WITH A SEAL

Filed Oct. 29, 1969  2 Sheets-Sheet 1

INVENTORS
JOHN H. SCHMID
ROBERT R. GIDNER
BY
*Poffler, Barn, & Bohm*
ATTORNEYS

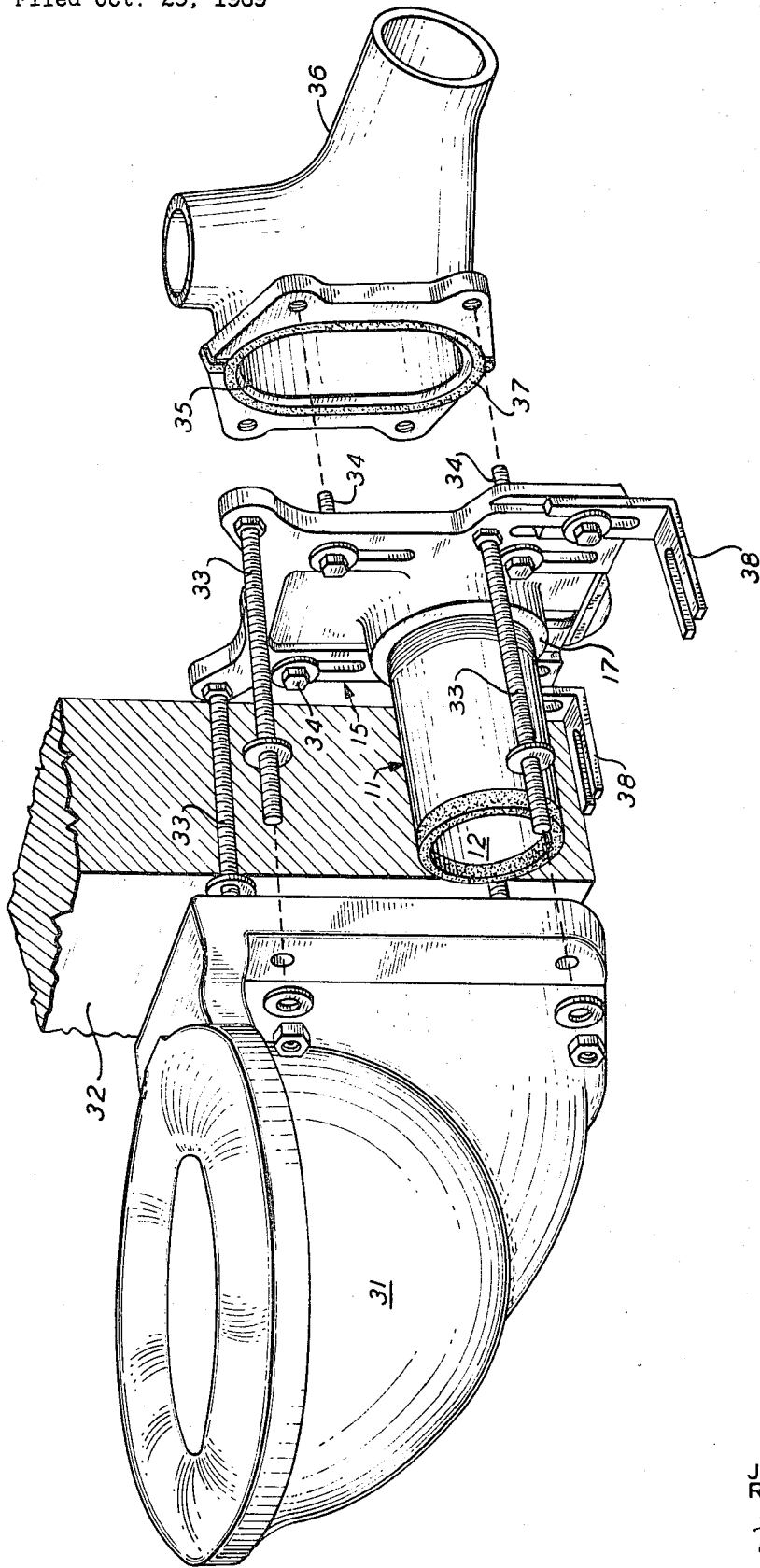

United States Patent Office 3,540,065
Patented Nov. 17, 1970

3,540,065
ADJUSTABLE COUPLING WITH A SEAL
Robert R. Gidner, Fairview, and John H. Schmid, Erie, Pa., assignors to Zurn Industries, Inc., Erie, Pa., a corporation of Pennsylvania
Continuation-in-part of application Ser. No. 754,617, Aug. 22, 1968. This application Oct. 29, 1969, Ser. No. 872,337
Int. Cl. E03d 11/00; F16l 5/00
U.S. Cl. 4—252     6 Claims

ABSTRACT OF THE DISCLOSURE

An adjustable coupling for use in connecting plumbing fixtures with plumbing fittings which provides a coupling with a thread having a cross-sectional sine wave configuration in which the peaks are narrower than the valleys, and the coupled member has a channel to receive an O-ring in sealing engagement with the coupling threads.

---

This application is a continuation-in-part of application Ser. No. 754,617, filed Aug. 22, 1968 and now abandoned.

SUMMARY OF THE INVENTION

Various plumbing fixtures require horizontal adjustment, and when such adjustments are complete, they must completely seal against leakage. Specifically, carries for water closets must be adjusted so that the water closet may be a proper distance from a wall structure by which the coupled member or fitting is covered. Therefore, it is often necessary to lengthen or shorten the horizontal extension distance of the coupling from a face plate. The coupling actually extends through a finished wall, and it becomes difficult, if not impossible to gain access to a jam-nut in order to loosen the coupling for adjustment. If the jam-nut is accessible, the space may be so small that it is difficult to reach and grip the jam-nut in order to loosen it. These difficulties are compounded by the use of a string gasket, which seals the space between the jam-nut and the nose flange of the face plate. When the jam-nut is loosened, the string gasket is often loosened and dangles from the nose flange.

Circular gaskets are not suitable for use in this situation. The string gasket is difficult and awkward to replace by reason of the closeness of the parts to the wall structure. It immediately appears desirable not to use a jam-nut and a string gasket.

It has been found that it is possible to eliminate the jam-nut and string-gasket, which cause so much trouble. This can be done by providing the interior of the nose flange of the face plate with an annular channel among the threads. An O-ring is seated in this channel. Thus, when the coupling is threaded into the nose flange, the O-ring is so dimensioned as to extend outwardly from the channel, and is compressed by the coupling, providing a tight internal seal between the coupling and the nose flange. No jam-nuts and string gasket is required and for that reason, the coupling and the face plate may be adjusted with respect to each other. At all times, there is a tight and continuous seal. In order to avoid the O-ring being chewed up by repeated contact with sharp threads, the coupling is provided with a thread which has a sine wave longitudinal sectional configuration wherein the radius of concave curvature is greater than the radius of convex curvature of the threads, and the two curves merge smoothly together. Since the valleys between the peaks of the thread have a greater radius of curvature than the peaks, the compressed O-ring extends into the wider valley, and makes a better seal, with less pressure on the O-ring and less torque is required to adjust the coupling.

DESCRIPTION OF DRAWINGS

These objects and advantages as well as other objects and advantages are attained by the device shown by way of illustration in the drawings in which:

FIG. 4 is an exploded view of fixture, coupling, face plate, and waste line.

DETAILED DESCRIPTION OF INVENTION

Figure 1:
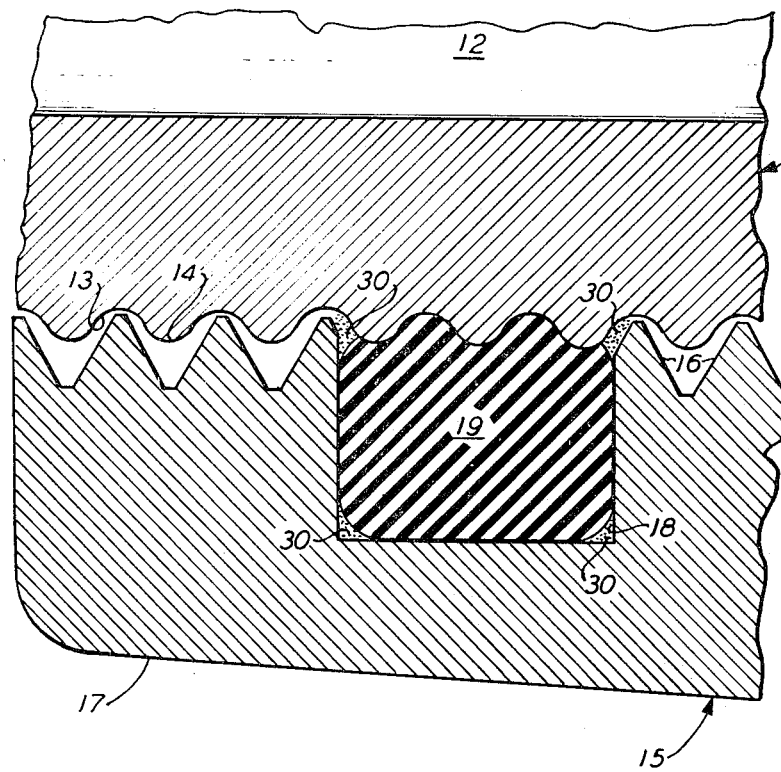
FIG. 1 is a partial sectional view of a coupling and a face plate.
Figure 2:
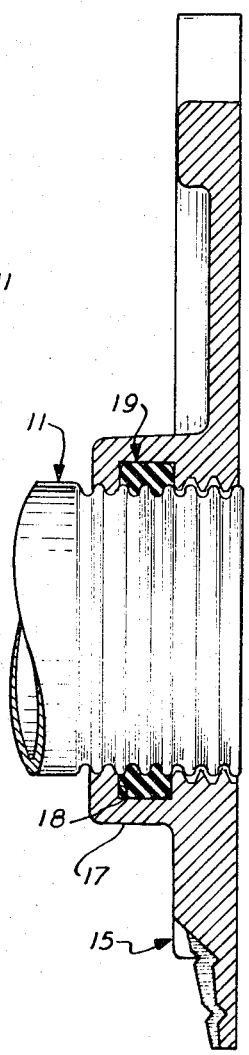
FIG. 2 is a vertical sectional view of the entire coupling and face plate.

Referring now to the drawings in detail, there is provided a male member of coupling 11. This coupling has a central internal passage 12. The coupling is externally threaded but a standard pipe thread is not used. The thread which is applied has a general sine wave configuration in which the concave radius of curvature of the thread is greater than the convex radius of the thread. Thus, the thread presents relatively narrower peaks joined together by relatively broader valleys. The peaks and valleys merge together in a smooth curve and neither the peaks nor the valleys have any sharply defined high or low points as in the standard pipe thread. As an example, the coupling 11 may be provided with a thread having concave radius or curvature ($r_1$) 13 which is approximately .040 inch and the convex radius of curvature ($r_2$) 14 may be approximately .028 inch. These radii give eight threads per inch of coupling with a depth of .040 inch. The sine wave thread would then engage with the standard eight threads per inch usual for all normal pipe sizes over two inches; .040 inch deep is considered the optimum thread depth for the present application. For other thread depths or other thread spaces, different radii must be computed. An O-ring compressed by such an external coupling thread, will ride the smooth surfaces of the thread without being cut, scored, or abraded in spite of the usual number of adjustments required. A tight seal is thereby insured.

A face plate 15 is provided. A circular opening in this face plate is provided with the standard pipe thread 16 as shown. This pipe thread has a sawtooth configuration. The face plate 15 has a nose 17 with the internal standard thread 16; this nose 17 has an annular transverse channel 18. The channel 18 is approximately three times the depth of the standard thread 16 and approximately three times the depth of the thread in its width, so that the channel is substantially square in cross-sectional area. A channel 18 wide enough to span three threads of the coupling is required, so that a compressed sealing ring will engage three thread peaks 14, and at least two included valleys 13; otherwise, the seal is poor. A compressible O-ring or sealing ring 19 is positioned in the channel 18 and extends out of the channel before the coupling 11 is inserted. The ring 19 should have sufficient cross-sectional area, so that when compressed, it contacts approximately three threads of the coupling. When the coupling 11 and the face plate 15 or coupled member are brought into threaded engagement with each other, the O-ring encounters the coupling thread and is compressed, and enters into the valleys 13 and impinges upon the peaks 14 which have been referred to as concave and convex aspects of the sine wave thread on the coupling 11. Since these concavities and convexities merge smoothly with each other, the threading of the coupling with the face plate 15 or coupled member brings the smoothly curved thread surface of the coupling into contact with the O-ring 19. Since the valleys or concavities of the thread on the coupling are greater in cros-sectional area than the peaks or convexities, the contact of the O-ring will be such as to permit it to spread throughout the valleys and to wipe over the smooth surfaces of the thread of the coupling without scoring, abrasion, or tearing. This makes for a tight seal without damage to the O-ring. Furthermore, the contact of the standard thread 16 with the concavities 13 in the coupling 11 is so slight that much less torque is required to adjust or turn the coupling. The O-ring 19 compressed much more easily into the wider concavities 13 allowing a superior seal with much less pressure on the O-ring. It is also noted that the concavities 13 and convexities 14 merge tangentially with each other and not in overlapped relationship. A lubricant 30 should fill the interstices of the cavity 18 to encourage easy adjustment, to help to prevent abrasion of the O-ring 19, and contribute to a better seal.

Figure 3:
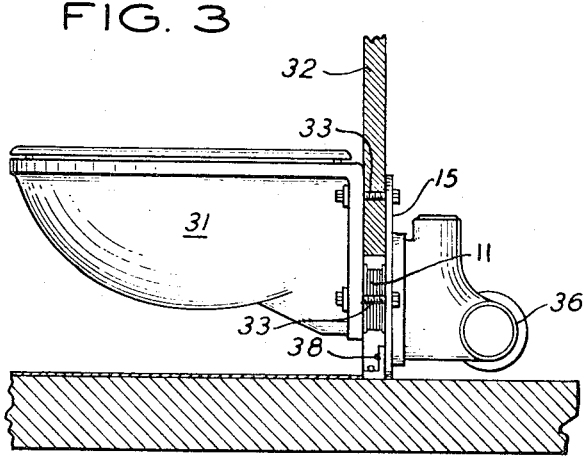
FIG. 3 is a side elevational view, of a fixture installed through a finished wall.

As will be seen in FIGS. 3 and 4 a toilet fixture 31 of suspended type shown by way of illustration is engaged with the coupling 11. The coupling 11 passes through the masonry wall 32, and is connected with the face plate 15. Bolts 33 clinch the face plate 15 to the fixture 31. The other side of the face plate 15 is attached by bolts 34 to the orifice 35 of the waste line 36, with a seal 37 to insure against leakage. The face plate 15 is also supported by feet 38.

FIG. 3 demonstrates how the need for adjustment of the coupling 11 would require the destruction of the wall 32 if a conventional jam or lock nut and string gasket were used to lock the coupling 11 and the face plate 15 together inside the wall 32. With the present construction, the coupling 11 may be threaded in and out of the face plate to accommodate the thickness of the wall 32 so as to be engagable with the fixture 31. The sealing ring 19 at all times yields such adjustment, yet no leakage is permitted. The lubricant 30 is preferably a silicone grease, which has been found to be compatible with most sealing rings and aids in accomplishing a tight seal, and prevents scuffing or scoring of the ring 19.

The internal seal eliminates the necessity for the use of a jam-nut and the conventional string gasket. It permits adjustment of the coupled member with the coupling with the application of much less torque. And the O-ring being disposed in opposition to a thread having a sine wave configuration permits radical adjustment of a coupling with a coupled member without any sharp thread engaged with the O-ring 19 so as to tear or damage it and permit leakage.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention; these substitutes are contemplated as being within the scope of the appended claims, although they are not specifically catalogued herein.

What is claimed is:
1. An adjustable coupling with a seal comprising
   (a) a toilet fixture,
   (b) a discharge port in the toilet fixture,
   (c) a generally tubular coupling connected at one end to the discharge port of the toilet fixture,
   (d) an external thread on the coupling,
   (e) the external thread of the coupling having different concave and convex radii of curvature that merge smoothly together,
   (f) a face plate defining a support for the toilet fixture,
   (g) means connecting the toilet fixture to the face plate, in supported relation therewith,
   (h) an internally threaded passage through the face plate having a different contour than said external thread,
   (i) the external thread of the coupling, engaged with the internal thread of the passage through the face plate,
   (j) a waste line,
   (k) the other end of the passage through the face plate connected to the waste line,
   (l) an annular channel in the internally threaded passage substantially as wide as three threads on the coupling,
   (m) a sealing ring in its uncompressed state dimensioned to fit into and extend out of the annular channel in the face plate,
   (n) the sealing ring engaged by the smooth external thread of the coupling and sealing the coupling to the face plate.

2. The device according to claim 1 in which the concave radius of curvature is approximately .040 inch and the convex radius of curvature is approximately .028 inch, and the thread pitch is approximately eight threads per inch.

3. The device according to claim 1 in which the thread depth is approximately .040 inch and the thread pitch is approximately eight threads per inch.

4. The devcie according to claim 1 in which the thread depth is approximately .040 inch.

5. The device according to claim 1 in which the face plate has a thread contour with the same number of threads per inch as the tubular coupling but the threads of the face plate are standard pipe threads.

6. The device according to claim 1 in which the sealing ring has an uncompressed cross-sectional area, sufficient when compressed by the coupling to span approximately three threads on the coupling.

References Cited

UNITED STATES PATENTS

| | | | |
|---|---|---|---|
| 2,469,074 | 5/1949 | Mueller | 285—355 X |
| 2,702,391 | 2/1955 | Schmid | 4—252 |
| 2,793,884 | 5/1957 | Jungblut | 285—231 |
| 2,901,754 | 9/1959 | Manas | 4—252 |
| 3,201,155 | 8/1965 | Billeter et al. | 285—355 X |

FOREIGN PATENTS

| | | |
|---|---|---|
| 549,936 | 8/1956 | Belgium. |
| 886,061 | 1/1962 | Great Britain. |

THOMAS F. CALLAGHAN, Primary Examiner

U.S. Cl. X.R.
285—64, 355